United States Patent [19]

Pona, Jr.

[11] Patent Number: 5,070,289
[45] Date of Patent: Dec. 3, 1991

[54] MINIATURE TACTICAL ANGULAR RATE SENSOR

[75] Inventor: Joseph Pona, Jr., Bayonne, N.J.

[73] Assignee: Allied-Signal Inc., Morris Township, Morris County, N.J.

[21] Appl. No.: 487,097

[22] Filed: Mar. 2, 1990

[51] Int. Cl.⁵ .............................................. G05B 17/00
[52] U.S. Cl. .................................. 318/640; 318/689; 318/138; 74/5.6 A
[58] Field of Search ............... 318/138, 254, 439, 463, 318/464, 648, 568–656, 721, 649; 310/90; 74/5 R, 5.37, 5.4, 5.42, 5.46, 5.47, 5.5, 5.6 R, 5.6 A, 5.6 D, 5.6 E, 5.7, 572

[56] References Cited

U.S. PATENT DOCUMENTS

| | | | |
|---|---|---|---|
| 3,501,967 | 3/1970 | Cotiis | 74/5.6 A |
| 3,596,523 | 8/1971 | Clark | 74/5.6 A |
| 3,697,143 | 10/1972 | Klinchurch | 74/5 R X |
| 3,722,295 | 3/1973 | Passarelli, Jr. | 74/5 R |
| 4,043,205 | 8/1977 | Merlo | 74/5.5 |
| 4,222,270 | 9/1980 | Allen | 318/648 X |
| 4,278,927 | 7/1981 | Grohe | 318/649 X |
| 4,320,669 | 3/1982 | Grohe | 74/5.6 D X |
| 4,329,884 | 5/1982 | Ferriss | 74/5.6 D |
| 4,452,092 | 6/1984 | Dankwort | 74/5.6 E X |
| 4,610,172 | 9/1986 | Mickle et al. | 74/5.6 E X |
| 4,651,576 | 3/1987 | Luke | 318/634 X |
| 4,818,922 | 4/1989 | Sears et al. | 318/138 X |
| 4,862,050 | 8/1989 | Parfomak et al. | 318/138 X |
| 4,947,067 | 8/1990 | Habermann et al. | 318/629 X |

Primary Examiner—Paul Ip
Attorney, Agent, or Firm—Howard G. Massung; Robert A. Walsh

[57] ABSTRACT

A miniature two degree of freedom fluid bearing angular rate sensor used primarily for tactical applications includes a spherical hydrodynamic fluid bearing rotor, a permanent magnet motor/torquer, and an optical pickoff, all of which are arranged to provide two axes of rate information in a small package. The individual components can be pre-assembled as sub-assemblies, and individually stocked and tested for final assembly.

6 Claims, 2 Drawing Sheets

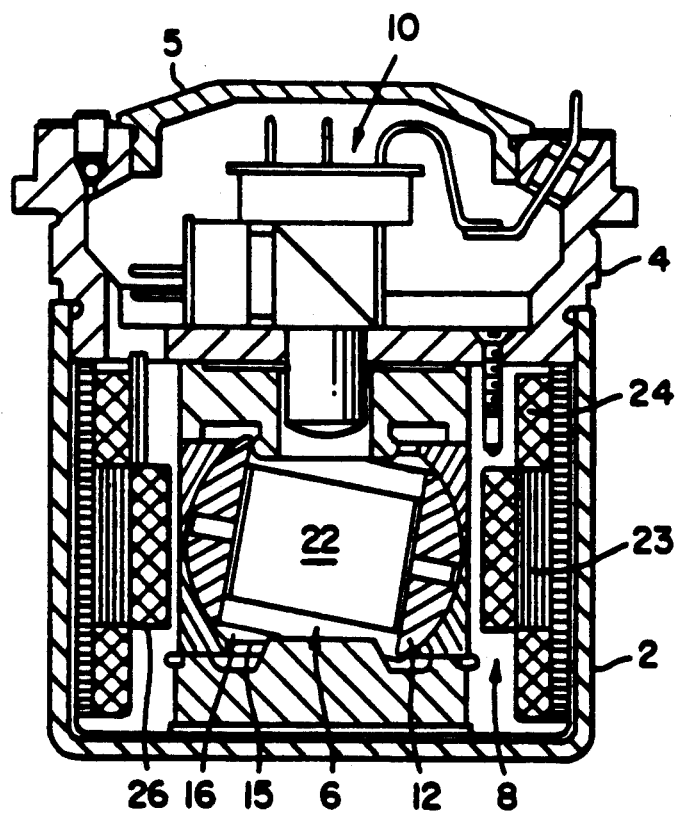
FIG. 1
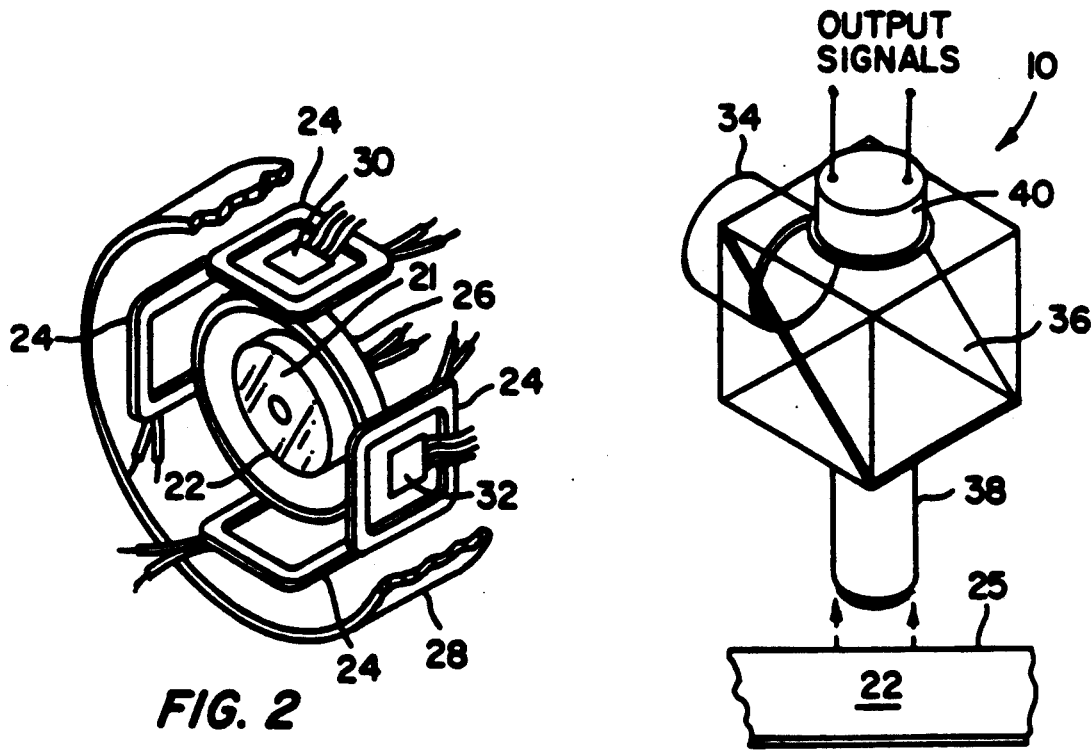
FIG. 2
FIG. 3

MINIATURE TACTICAL ANGULAR RATE SENSOR

BACKGROUND OF THE INVENTION

This invention relates to miniature two degree of freedom fluid bearing angular rate sensors for use primarily in tactical applications, i.e. for inertially guiding a missile or the like from launch to target.

Angular rate sensors, for the purposes described must be small, rugged and inexpensive to manufacture. For purposes of example, specifications for a particular two degree of freedom tactical angular rate sensor require the instrument to provide two axes of angular rate information in a package one inch in diameter and one and one-quarter inches in length. The instrument must be designed for constant angular rates up to 300 degrees per second. The sensor rotor bearing suspension must be able to sustain 40 g's of linear acceleration without degradation of performance. To best serve the purposes intended, the sensor should have a minimum number of components.

The present invention achieves the aforementioned requirements by featuring a miniature tactical angular rate sensor having a spherical hydrodynamic fluid bearing rotor component, a permanent magnet motor/torquer component and an optical pick-off component. The arrangement is such that each component can be preassembled as a sub-assembly, tested and stocked for final assembly, the same being recognized as advantageous.

SUMMARY OF THE INVENTION

This invention contemplates a miniature two degree of freedom, simple, economical angular rate sensor capable of surviving severe environments. The sensor provides two axes of analog outputs corresponding to sensed angular rate.

A spherical hydrodynamic fluid bearing rotor component includes two parts, i.e. a rotor bearing and a cylindrical, two pole permanent magnet having a reflective surface. The magnet is used for both torquer and spin motor operation, as well as providing a reflective surface for an optical pick-off.

A single permanent magnet rotor and an ironless stator containing the sensor spin motor and torquer windings are the main features of a motor/torquer (magnetic) component.

An optical pick-off component includes a light emitting diode (LED) light source, an optical beam splitter, a lens, the reflective surface on the rotor magnet and an optical quadrant detector.

The hydrodynamic bearing, the spin motor and torquer, and the optical pick-off are configured as three separate components for providing simplicity in design and a minimal number of parts resulting in an easily assembled, inexpensive instrument, and otherwise satisfying the intended requirements of the invention.

BRIEF DESCRIPTION OF THE DRAWINGS

FIG. 1 is a sectional diagrammatic view generally showing the several components of the invention.

FIG. 2 is an isometric diagrammatic representation showing the spin motor and torquer component.

FIG. 3 is an isometric diagrammatic representation showing the optical pick-off component.

DETAILED DESCRIPTION OF THE INVENTION

With reference first to FIG. 1, the miniature tactical angular rate sensor of the invention is supported within members 2, 4 and 5. Members 2, 4 and 5 provide a suitable evacuated and hermetically sealed case or housing for the sensor.

The sensor includes three basic components: a hydrodynamic bearing component 6; a spin motor and torquer component 8 and a signal generator or pick-off component 10.

Figure 5:
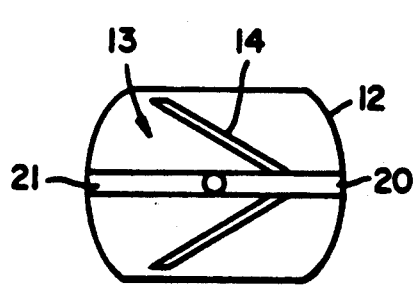
FIG. 5 is a diagrammatic representation showing the hydrodynamic bearing rotor.

Hydrodynamic bearing component is configured in accordance with the theory of hydrodynamic lubrication for fluid bearings, and to this end includes a spherical rotor 12 having an external spiral grooved pattern designated generally by the numeral 13, as particularly shown in FIG. 5. With reference to FIG. 5, groove pattern 13 may include a plurality of V-shaped grooves 14. In the preferred embodiment of the invention twenty-three such grooves (only one is shown) are equally spaced within 0.003 inches at any given latitude. The groove widths are tapered and the grooves have the same longitudinal width within 0.003 inches at any given latitude. The grooves are 0.000180 to 0.000220 inches deep and are of the same depth within 0.000020 inches.

Figure 6:
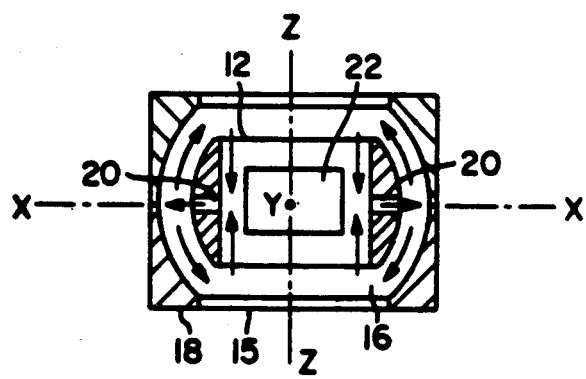
FIG. 6 is a diagrammatic representation showing the hydrodynamic bearing component and the fluid flow characteristics thereof.

Rotor 12, when rotating, generates a pressurized layer of gas which suspends the rotor within its housing 15 as particularly shown in FIGS. 1 and 6. Housing 15 includes a spherical cavity 16. Thus, with the arrangement described, rotor 12 is supported within cavity 16 on a fluid cushion, and which fluid may be a suitable gas, so that the rotor is free to rotate about X and Y pick-off axes and a rotor spin axis Z (FIG. 6), resulting in a two degree of freedom arrangement as is desired.

With continued reference to FIG. 6, the hydrodynamic characteristics of spherical rotor 12 supported in matching spherical cavity 16 in housing 15 are illustrated. Thus, gas flows through a hole 20 perpendicular to rotor spin axis Z and through and around the rotor as indicated by the arrows to provide the required rotor suspension.

Spin motor and torquer component 8 includes a single permanent magnet 22 (FIGS. 1, 2, 3 and 6) and an ironless stator 23 supporting windings 24 for the spin motor and windings 26 for the torquer (FIG. 1).

With particular reference to FIG. 2, magnet 22 is a two pole, cylindrical, permanent magnet mounted on rotor 12 through the center thereof (FIG. 1). Magnet 22, which has a reflective surface 21, is surrounded by torquer windings 26 which, in turn, are surrounded by motor windings 24 which are actually four separate winding arrangements. A suitable magnetic shield 28 surrounds motor windings 24.

A pair of Hall elements 30 and 32 are embedded in motor stator windings 24. Hall elements 30 and 32 provide outputs relating to the location of the poles of magnet 22 for continuous two phase closed loop operation as will hereinafter become evident. As will be further described with reference to FIG. 4, a commutator arrangement is driven by a processed feedback signal from the Hall elements and applies a drive signal to provide proper rotor polarity and synchronization. This signal is suitably amplified and provides the required power to accelerate and maintain the rotor at a particular commanded speed.

Torquer windings 26 in cooperation with magnet 22 maintain rotor 12 properly positioned in cavity 16 of housing 15. This is achieved by the torquer arrangement including magnet 22 and windings 26 applying the proper force required to null out the output signals from pick-off component 10. The output signals provide continuous information of the position of magnet 22 while Hall elements 30 and 32 provide the commutation angle relative to the rotor housing.

The output signals, along with the commutation signals, are processed by a conventional feedback loop 48 (FIG. 4) to provide a current output to the torquer arrangement aforenoted. The magnitude and phase of this current output is applied to the torquer arrangement to generate an axial field of the desired strength and timing, such that a net desired torque is provided to correct the rotor position of rotor magnet 22. The current is resolved through conventional resolver circuitry (not otherwise shown) to determine the applied rate information for each of the X and Y axes.

With particular reference to FIG. 3, pick-off 10 is utilized to sense the relative precession of rotor 12 as a result of rates applied to the sensor about its input axes. Thus, pick-off 10 includes a light emitting diode (LED) light source 34, an optical beam splitter 36, a lens 38, reflective surface 25 of rotor magnet 22 and an optical quadrant detector 40.

Optical quadrant detector 40 is a four cell photodiode quadrant detector, and reacts to light energy for generating a proportional current output. The current from each quadrant is summed and differentially amplified by conventional pick-off electronics (not otherwise shown). At pick-off null, the light reflected from reflective surface 25 of magnet 22 equally illuminates all four quadrants of detector 40. This occurs when rotor 12 is centered in cavity 16 of housing 15.

Off null, i.e. when the sensor rotor has precessed, the reflected beam differentially illuminates the four quadrants. Thus, some quadrants receive more illumination while opposite quadrants receive less. This results in a differential electrical output which is converted by conventional processing electronics (not otherwise shown) to linear output signals proportional to the precessed angular position of the rotor. These output signals are utilized by the aforementioned feedback loop as will be hereinafter described The construction of optical quadrant 40 on a common substrate as is the case provides two axes of rate information and tends to be self-compensating for temperature sensitivity effects.

Beam splitter 36 redirects the reflected light beam so that light source 34 and quadrant detector 40 need not be co-linear In the absence of beam splitter 36, a central hole through quadrant detector 40 would be necessary and an alternate mechanization would be provided.

Beam splitter 36 is configured to reflect fifty percent of the beam at the diagonal interface at each pass. The remaining fifty percent is transmitted, without reflection. Lens 38 is used to properly focus the reflected light beam.

Figure 4:
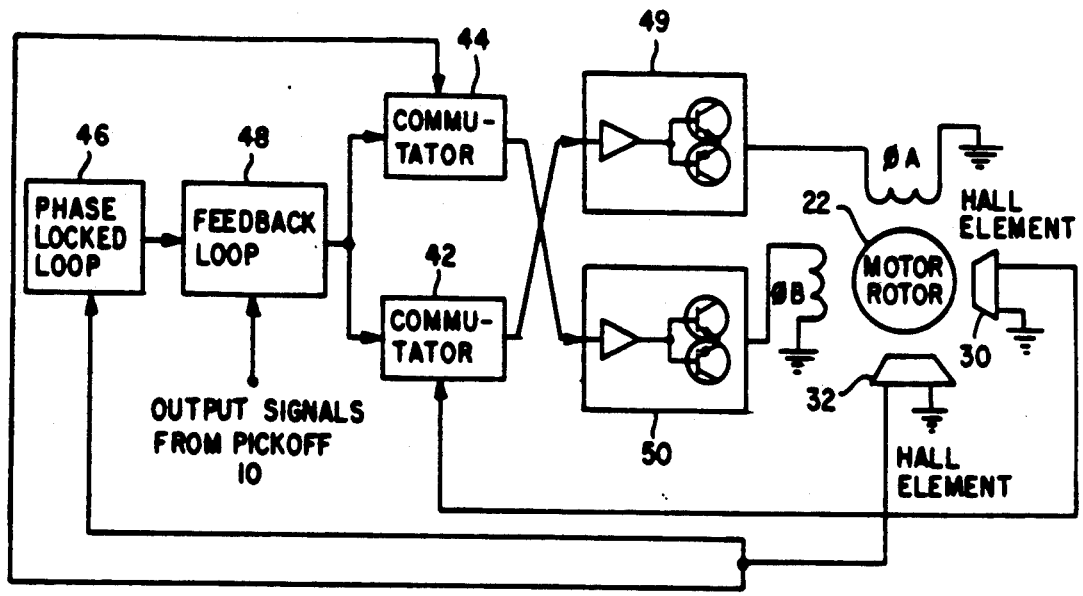
FIG. 4 is an electrical schematic/block diagram showing the electrical features of the spin motor and torquer component.

With reference now to FIG. 4, the output of Hall element 30 providing information as aforenoted is applied to a commutator 42, and the output from Hall element 32 likewise providing the aforenoted information is applied to a commutator 44. The output from Hall element 32 is applied to a phase locked loop 46.

The outputs from phase locked loop 46 and from pick-off 10 are applied to feedback loop 48 which provides controlling outputs to commutators 42 and 44. The output from commutator 42 is applied to a driver arrangement 49 which drives phase A of the two-phase sensor motor which includes windings 24 and magnet 22. The output from commutator 44 is applied to a driver arrangement 50 which drives phase B of the two-phase motor.

Thus, as illustrated in FIG. 4, Hall elements 30 and 32 are effective for providing magnetic pole location information for continuous two phase closed loop operation of the sensor motor. Commutators 42 and 44 are driven by a processed feedback signal from the Hall elements to switch a drive signal to provide proper motor rotor polarity and synchronization. The drive signal is amplified via driver arrangements 49 and 50, as the case may be, to provide the required power to drive, i.e. to accelerate and maintain the motor rotor at a commanded speed.

It will thus be seen from the aforenoted description of the invention that a miniature two degree of freedom fluid bearing sensor, primarily for tactical applications, has been provided. The sensor includes a spherical hydrodynamic fluid bearing rotor, a permanent magnet motor/torquer, and an optical pick-off, whereby two axes of rate information are provided in a small package as is the intended purpose of the invention. The spherical hydrodynamic fluid bearing rotor heretofore described provides a suspension which sustains the aforenoted 40 g's of linear acceleration at a rotational speed of 24,000 RPM. The aforenoted packaging results in a minimum number of parts which tends to reduce static and dynamic balance effects as is desirable. The spherical rotor arrangement described provides the ruggedness necessary to survive severe shock levels without degradation in performance, as will now be understood.

With the foregoing description of the invention in mind, reference is made to the claims appended hereto for a definition of the scope of the invention.

What is claimed is:

1. A two degree of freedom angular rate sensor, comprising:

a spherical rotor and a housing having a matching spherical cavity within which the rotor is suspended;

a two pole cylindrical permanent magnet mounted to the spherical rotor suspended within the spherical cavity through the center of the rotor;

means for hydrodynamically suspending the spherical rotor within the matching housing cavity;

means arranged with the suspended spherical rotor for rotating said rotor, including a motor having a rotor element which is the two pole cylindrical permanent magnet mounted to the spherical rotor suspended within the spherical cavity, and a stator element, said stator element carrying a plurality of coil segments surrounding the rotor element so as to be in magnetically cooperative relation therewith;

means arranged with the rotating suspended spherical rotor for sensing the position thereof due to angular rates sensed by the sensor about two mutually perpendicular output axes and for providing corresponding output signals;

means arranged with the rotating suspended spherical rotor for positioning said rotor so that said output signals are at null, including a torquer having a torquing element which is the two pole cylindrical permanent magnet mounted to the spherical rotor, and a single annular torquer winding carried by the stator element and surrounded by the plurality of coil segments, and the torquer winding surrounding the torquing element so as to be in magnetically cooperative relation therewith; and means arranged with the position sensing means and with the rotor positioning means for energizing said rotor positioning means commensurate with the sensed angular rates to maintain the output signals at null including the torquer winding arranged with said means arranged with said position sensing means and with said rotor positioning means and affecting the rotor positioning means for positioning the rotor commensurate with the sensed angular rates to maintain the output signals at null.

2. A sensor as described by claim 1, wherein the means for hydrodynamically suspending the spherical rotor within the matching spherical cavity includes:

the spherical rotor having a spin axis;

the spherical housing cavity containing a fluid;

the spherical rotor having a through hole substantially perpendicular to the spin axis so that the fluid in the spherical cavity flows through the hole and in and around the rotor to provide a fluid cushion for the rotor; and a spiral groove pattern on the surface of the spherical rotor, whereby rotation of the rotor generates a pressurized layer of fluid for suspending the rotor within the cavity, with the rotor thereupon being free to rotate about the two mutually perpendicular axes and about the spin axis.

3. A sensor as described by claim 1, including:

a magnetic shield surrounding the stator element.

4. A sensor as described by claim 1, including:

means supported by at least two of the plurality of coil segments for providing signals corresponding to the position of the two poles of the cylindrical permanent magnet; and means connected to said position signal providing means and responsive to the signals therefrom for driving the motor.

5. A sensor as described by claim 4, including:

means connected to the means for providing output signals corresponding to the position of the spherical rotor due to angular rates sensed by the sensor about two mutually perpendicular axes and to the means for providing signals corresponding to the position of the two poles of the cylindrical permanent magnet, and connected to the torquer; and said means being responsive to all of said signals for energizing the torquer commensurate with the sensed angular rates whereby the torquer positions the spherical rotor so that the output signals are at null and are maintained at null.

6. A sensor as described by claim 1, wherein the means arranged with the rotating suspended spherical rotor for sensing the position thereof due to angular rates sensed by the sensor about two mutually perpendicular output axes and for providing corresponding signals includes:

the two pole cylindrical permanent magnet mounted to the spherical rotor suspended within the spherical cavity having a light reflecting surface;

optical means for directing light to the light reflecting surface and for sensing light reflected therefrom;

the amount of light sensed being commensurate with the position of the spherical rotor; and said optical means being responsive to the sensed light for providing the output signals.

* * * * *